US011032840B2

(12) United States Patent
Yang et al.

(10) Patent No.: US 11,032,840 B2
(45) Date of Patent: Jun. 8, 2021

(54) RESOLUTION OF COLLISIONS BETWEEN BEAM FAILURE RECOVERY REQUESTS AND UPLINK COMMUNICATIONS

(71) Applicant: QUALCOMM Incorporated, San Diego, CA (US)

(72) Inventors: Wei Yang, San Diego, CA (US); Seyedkianoush Hosseini, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/805,383

(22) Filed: Feb. 28, 2020

(65) Prior Publication Data

US 2021/0144740 A1 May 13, 2021

Related U.S. Application Data

(60) Provisional application No. 62/934,434, filed on Nov. 12, 2019.

(51) Int. Cl.
*H04L 12/24* (2006.01)
*H04W 72/12* (2009.01)
*H04L 5/00* (2006.01)

(52) U.S. Cl.
CPC ....... *H04W 72/1284* (2013.01); *H04L 5/0007* (2013.01); *H04L 5/0048* (2013.01); *H04L 5/0053* (2013.01)

(58) Field of Classification Search
CPC ............. H04W 72/1284; H04W 76/19; H04W 72/0446; H04W 72/042; H04W 72/10; H04W 72/046; H04L 5/0053; H04L 5/0048; H04L 27/0008; H04L 41/0654; H04L 25/0202; H04L 25/0224; H04L 43/0823; H04B 7/0695; H04B 7/088
See application file for complete search history.

(56) References Cited

U.S. PATENT DOCUMENTS

| | | | |
|---|---|---|---|
| 2011/0205981 A1 | 8/2011 | Koo et al. | |
| 2014/0126516 A1* | 5/2014 | Kato | H04W 74/0833 370/329 |
| 2015/0245405 A1* | 8/2015 | Johansson | H04W 76/18 370/228 |

(Continued)

FOREIGN PATENT DOCUMENTS

| | | |
|---|---|---|
| CA | 3045809 A1 | 11/2019 |
| WO | WO-2018230862 A1 | 12/2018 |

(Continued)

OTHER PUBLICATIONS

International Search Report and Written Opinion—PCT/US2020/070499—ISA/EPO—Jan. 14, 2021.

*Primary Examiner* — Jung Liu
(74) *Attorney, Agent, or Firm* — Qualcomm Incorporated

(57) ABSTRACT

Various aspects of the present disclosure generally relate to wireless communication. In some aspects, a user equipment (UE) may combine an indication of a beam failure recovery request or one or more scheduling requests with uplink control information that is to be transmitted in a resource. The UE may transmit the uplink control information combined with the indication in the resource. Numerous other aspects are provided.

30 Claims, 8 Drawing Sheets

(56) References Cited

U.S. PATENT DOCUMENTS

| | | | |
|---|---|---|---|
| 2015/0245407 A1* | 8/2015 | Johansson | H04W 76/19 |
| | | | 370/329 |
| 2017/0207843 A1* | 7/2017 | Jung | H04B 7/0695 |
| 2018/0006770 A1* | 1/2018 | Guo | H04L 1/1835 |
| 2018/0110066 A1 | 4/2018 | Luo et al. | |
| 2018/0219604 A1* | 8/2018 | Lu | H04B 7/0695 |
| 2018/0359790 A1* | 12/2018 | Ingale | H04W 28/16 |
| 2019/0052343 A1 | 2/2019 | Li et al. | |
| 2019/0098672 A1* | 3/2019 | Murray | H04B 7/088 |
| 2019/0199412 A1* | 6/2019 | Koskela | H04W 72/0446 |
| 2019/0253308 A1* | 8/2019 | Huang | H04B 7/0695 |
| 2019/0306875 A1* | 10/2019 | Zhou | H04W 72/1284 |
| 2019/0312618 A1 | 10/2019 | Akkarakaran et al. | |
| 2019/0349061 A1* | 11/2019 | Cirik | H04W 80/02 |
| 2020/0120704 A1* | 4/2020 | Wang | H04W 76/19 |
| 2020/0177424 A1 | 6/2020 | Noh et al. | |

FOREIGN PATENT DOCUMENTS

| | | |
|---|---|---|
| WO | WO-2019031954 A1 | 2/2019 |
| WO | WO-2019131985 A1 | 7/2019 |
| WO | WO-2019191960 A1 | 10/2019 |

* cited by examiner

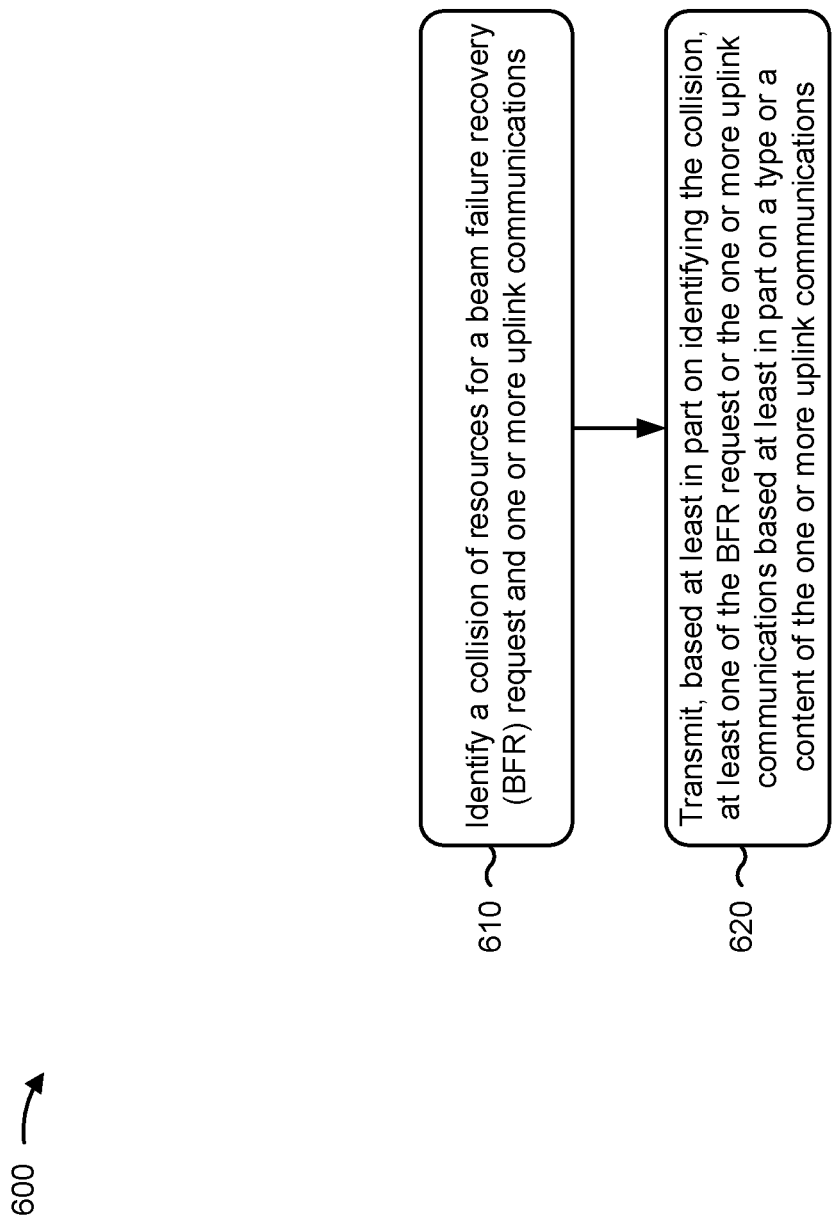

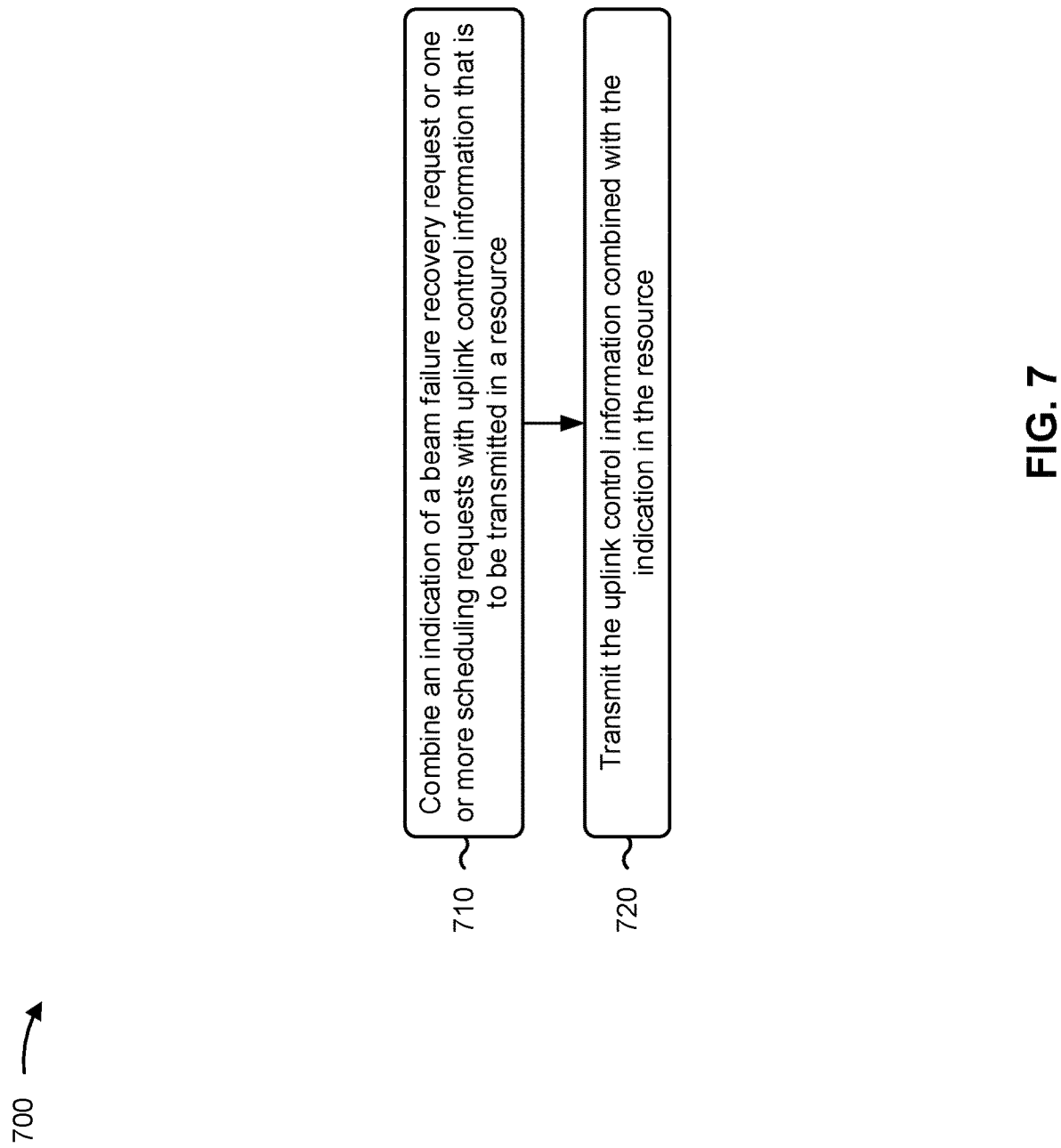

RESOLUTION OF COLLISIONS BETWEEN BEAM FAILURE RECOVERY REQUESTS AND UPLINK COMMUNICATIONS

CROSS-REFERENCE TO RELATED APPLICATION

This Patent Application claims priority to Provisional Patent Application No. 62/934,434, filed on Nov. 12, 2019, entitled "RESOLUTION OF COLLISIONS BETWEEN BEAM FAILURE RECOVERY REQUESTS AND UPLINK COMMUNICATIONS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for resolution of collisions between beam failure recovery requests and uplink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful. Preferably, these improvements should be applicable to other multiple access technologies and the telecommunication standards that employ these technologies.

SUMMARY

In some aspects, a method of wireless communication, performed by a user equipment (UE), may include identifying a collision of resources for a beam failure recovery (BFR) request and one or more uplink communications; and transmitting, based at least in part on identifying the collision, at least one of the BFR request or the one or more uplink communications based at least in part on a type or a content of the one or more uplink communications.

In some aspects, a UE for wireless communication may include memory and one or more processors coupled to the memory. The memory and the one or more processors may be configured to identify a collision of resources for a BFR request and one or more uplink communications; and transmit, based at least in part on identifying the collision, at least one of the BFR request or the one or more uplink communications based at least in part on a type or a content of the one or more uplink communications.

In some aspects, a non-transitory computer-readable medium may store one or more instructions for wireless communication. The one or more instructions, when executed by one or more processors of a UE, may cause the one or more processors to: identify a collision of resources for a BFR request and one or more uplink communications; and transmit, based at least in part on identifying the collision, at least one of the BFR request or the one or more uplink communications based at least in part on a type or a content of the one or more uplink communications.

In some aspects, an apparatus for wireless communication may include means for identifying a collision of resources for a BFR request and one or more uplink communications; and means for transmitting, based at least in part on identifying the collision, at least one of the BFR request or the one or more uplink communications based at least in part on a type or a content of the one or more uplink communications.

In some aspects, a method of wireless communication, performed by a UE, may include combining an indication of a BFR request or one or more scheduling requests with uplink control information that is to be transmitted in a resource; and transmitting the uplink control information combined with the indication in the resource.

In some aspects, a UE for wireless communication may include memory and one or more processors coupled to the memory. The memory and the one or more processors may be configured to combine an indication of a beam failure recovery request or one or more scheduling requests with uplink control information that is to be transmitted in a resource; and transmit the uplink control information combined with the indication in the resource.

In some aspects, a non-transitory computer-readable medium may store one or more instructions for wireless communication. The one or more instructions, when executed by one or more processors of a UE, may cause the one or more processors to: combine an indication of a beam failure recovery request or one or more scheduling requests with uplink control information that is to be transmitted in a resource; and transmit the uplink control information combined with the indication in the resource.

In some aspects, an apparatus for wireless communication may include means for combining an indication of a BFR request or one or more scheduling requests with uplink control information that is to be transmitted in a resource; and means for transmitting the uplink control information combined with the indication in the resource.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6 and 7 are diagrams illustrating example processes performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, specific structures and/or functions described herein are to facilitate the disclosure of various aspects of implementations described herein. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
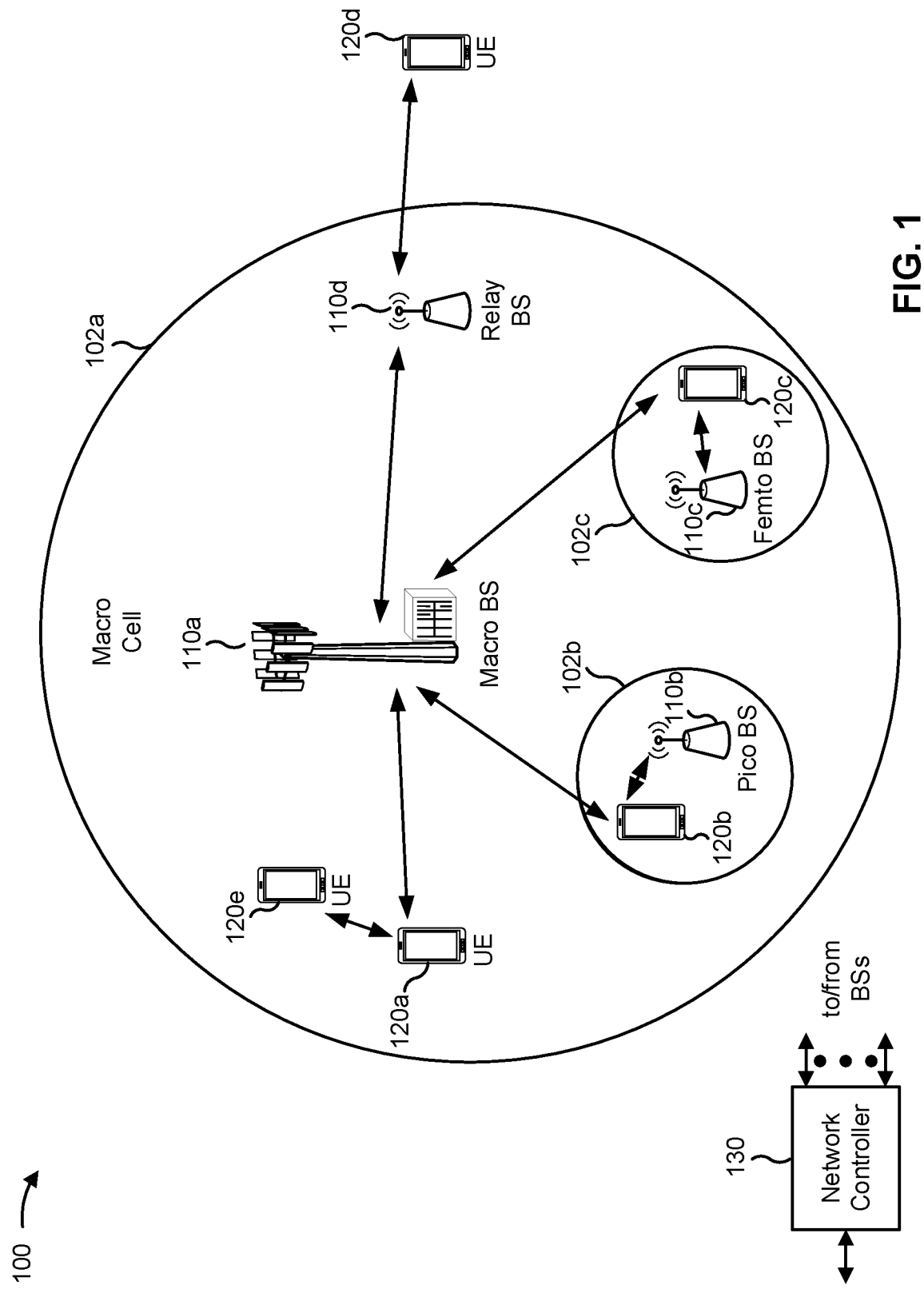
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
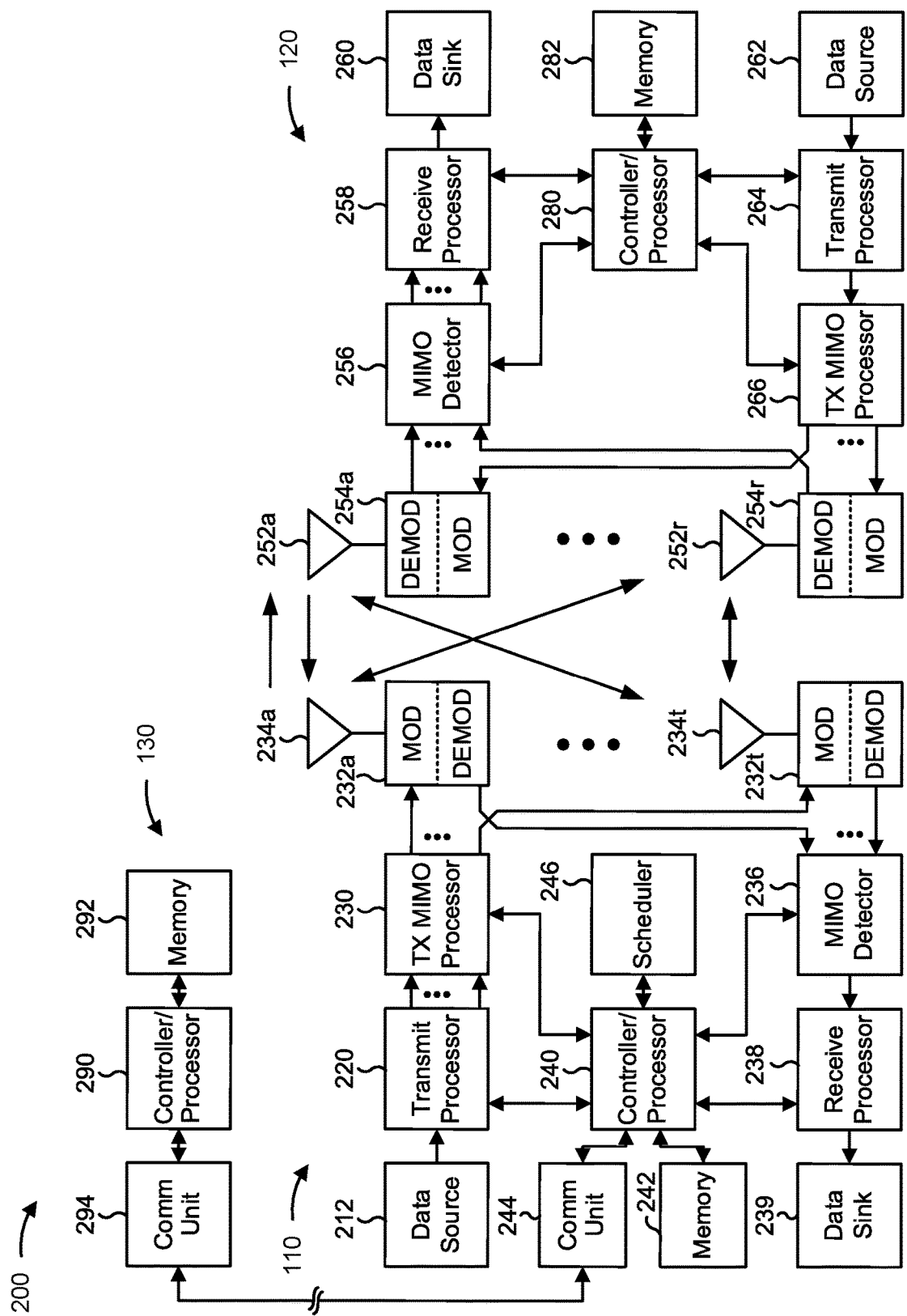
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with resolution of collisions between beam failure recovery requests and uplink communications, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. Memory 282 of UE 120 comprises a non-transitory computer-readable medium storing one or more instructions for wireless communication, where the one or more instructions comprise one or more instructions that, when executed by one or more processors (e.g., receive processor 258, transmit processor 264, and/or controller/processor 280) of the UE 120, cause the one or more processors to perform the method described in greater detail with reference to FIGS. 5-7. A scheduler 246 may schedule UEs for data transmission on the downlink and/or uplink.

In some aspects, UE 120 may include means for identifying a collision of resources for a BFR request and one or more uplink communications (e.g., using controller/processor 280 and/or the like), means for transmitting, based at least in part on identifying the collision, at least one of the BFR request or the one or more uplink communications based at least in part on a type or a content of the one or more uplink communications (e.g., using controller/processor 280, transmit processor 264, TX MIMO processor 266, MOD 254, antenna 252, and/or the like), means for combining an indication of a BFR request or one or more scheduling requests with uplink control information that is to be transmitted in a resource (e.g., using controller/processor 280 and/or the like), means for transmitting the uplink control information combined with the indication in the resource (e.g., using controller/processor 280, transmit processor 264, TX MIMO processor 266, MOD 254, antenna 252, and/or the like), and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
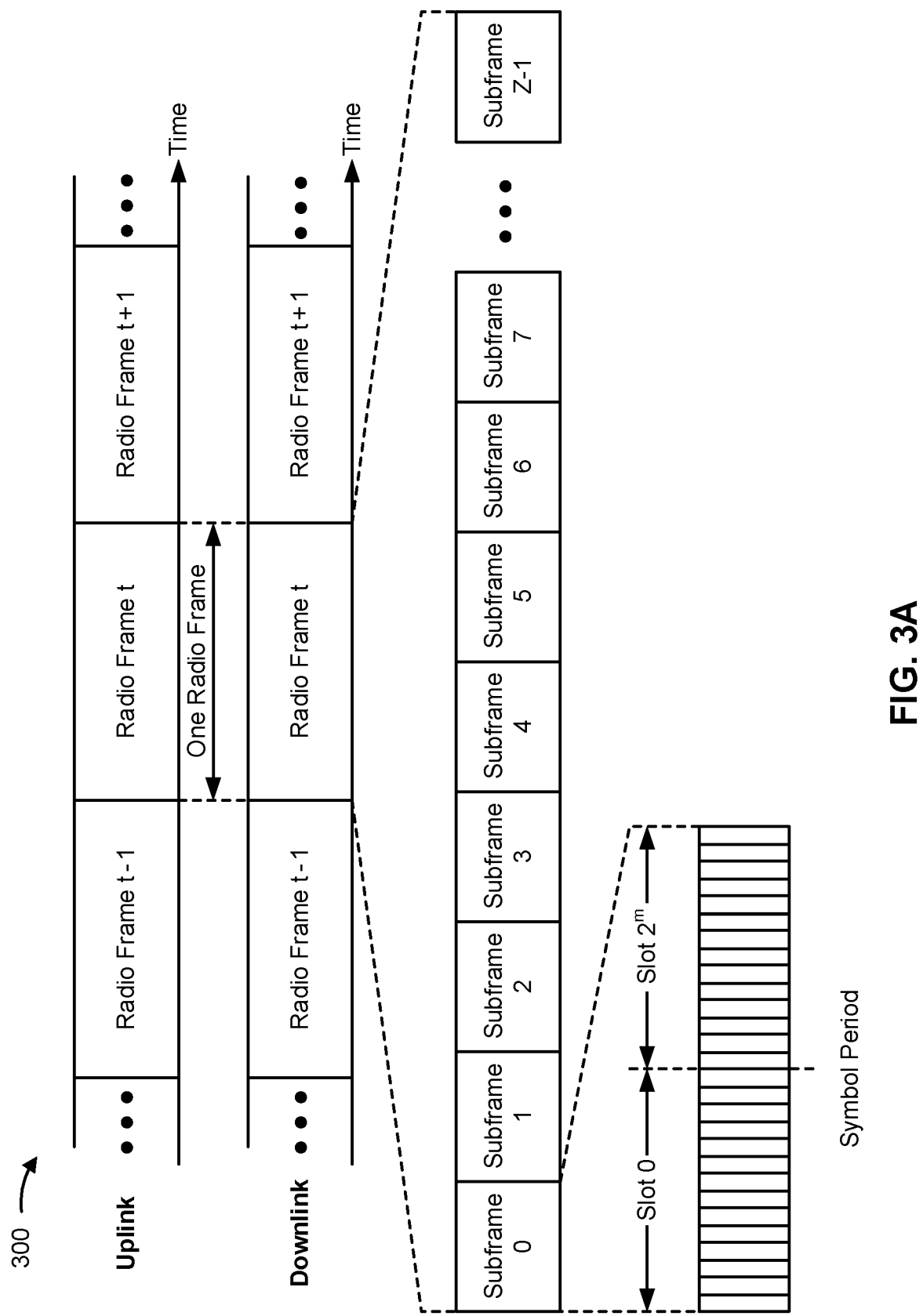
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
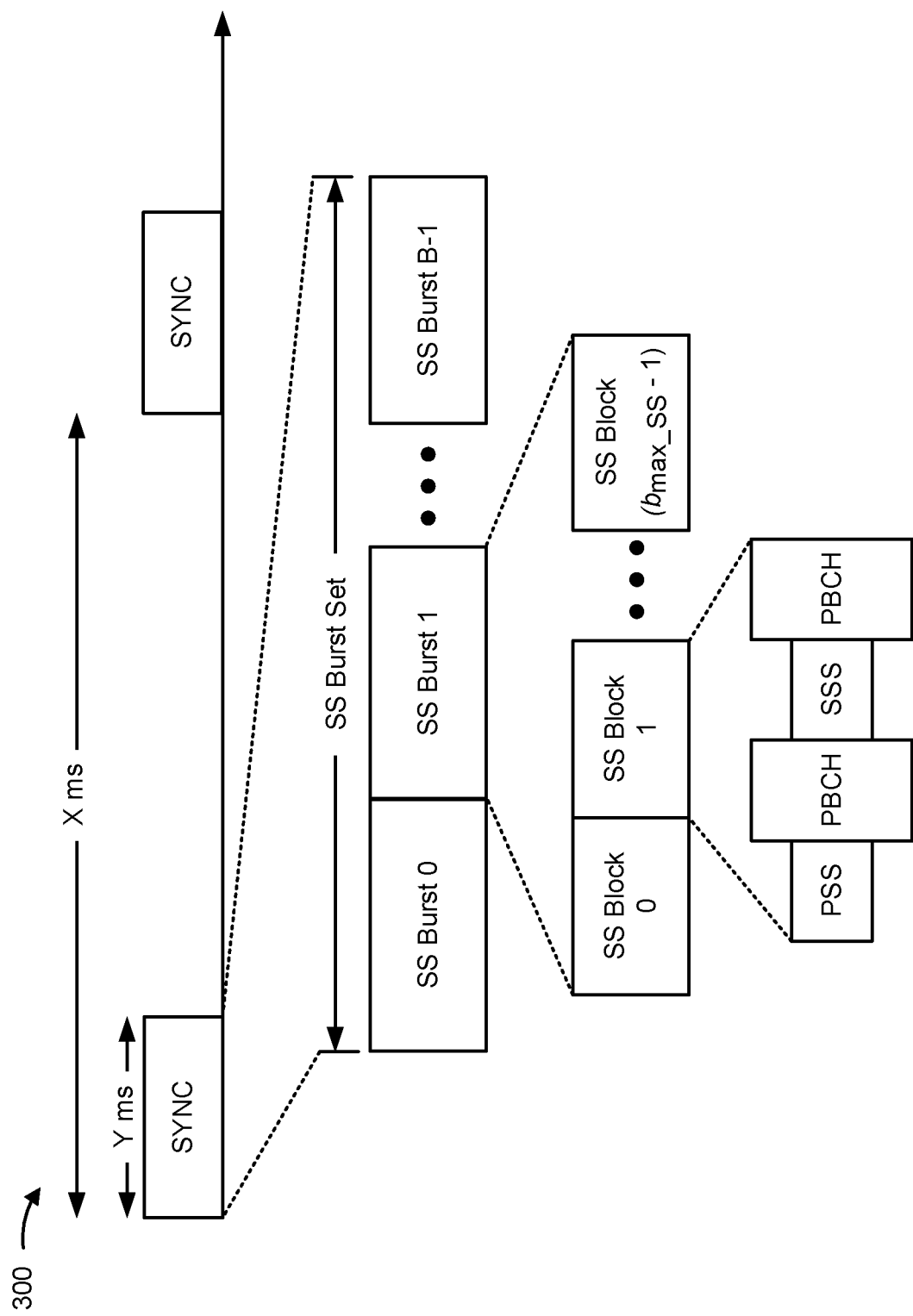
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
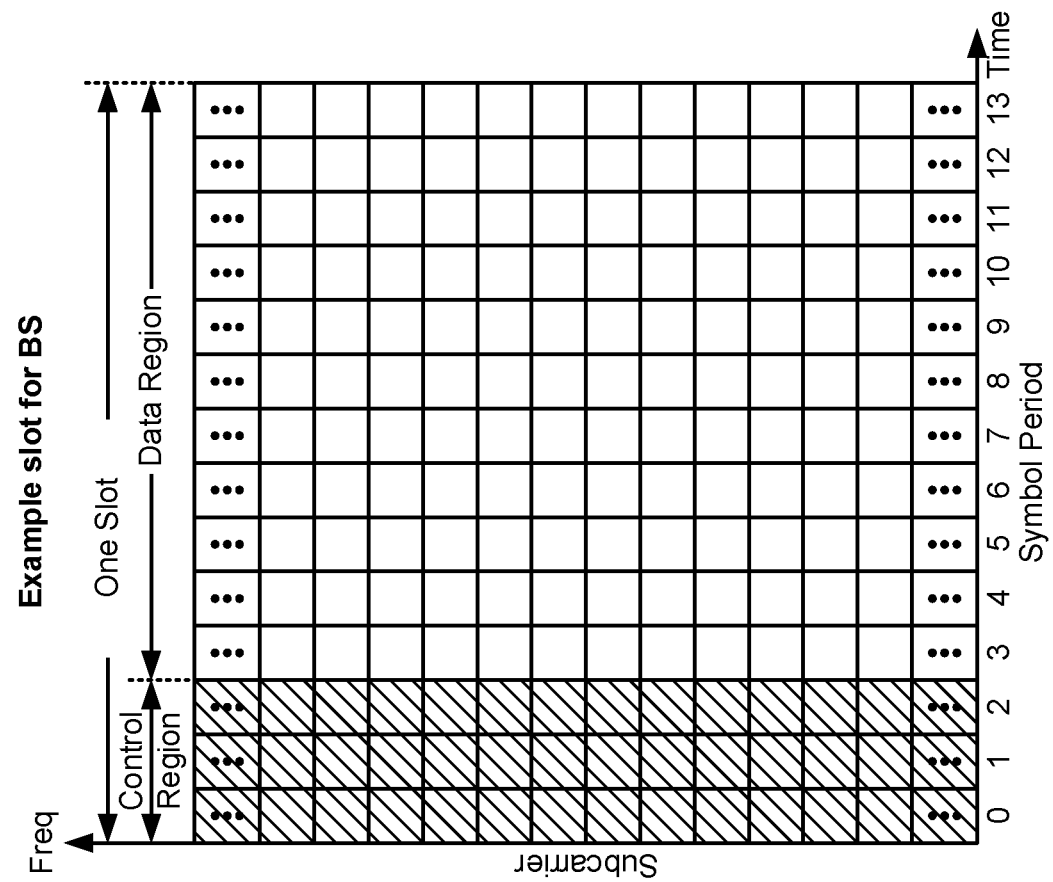
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In a wireless network, a BS and a UE may communicate over a downlink channel. In some cases, the BS may aggregate a plurality of radio frequency carriers for the downlink channel, which may be referred to as carrier aggregation. Carrier aggregation may increase the bandwidth of the downlink channel, which in turn may increase throughput on the downlink channel, increase reliability of the downlink channel, decrease latency on the downlink channel, and/or the like. Each radio frequency carrier in a carrier-aggregated downlink channel may be referred to as a component carrier (CC). Moreover, each CC may be associated with a serving cell of the BS. For example, a primary CC may be associated with a primary cell, and a secondary CC may be associated with a secondary cell.

In some cases, the UE may establish communications with each cell served by a CC via a respective beam. To provide failure detection of the beams, each cell may transmit (e.g., via the BS) a respective beam failure detection reference signal (BFD-RS). The UE may perform one or more measurements of a BFD-RS and may determine whether a corresponding beam has failed based at least in part on the one or more measurements. If the UE detects a beam failure associated with a cell, the UE may transmit a beam failure recovery (BFR) request to a primary cell using a resource (e.g., a periodic resource) that was allocated to the UE for transmitting BFR requests. In response, the primary cell may provide an uplink grant to the UE for transmitting a BFR communication associated with the BFR request (e.g., to identify the beam that failed).

In some cases, the resource allocated to the UE for transmitting BFR requests may collide with a resource allocated to the UE for transmitting another uplink communication, such as a scheduling request, an acknowledgment or negative acknowledgment (ACK/NACK) feedback communication, a channel state information (CSI) report, a physical uplink shared channel (PUSCH) communication, and/or the like. However, the UE may not be enabled to resolve a collision of the resource for the BFR request and the resource for the other uplink communication, thereby reducing a performance of the BFR request and/or the other uplink communication.

Some techniques and apparatuses described herein enable a UE to resolve a collision of a resource allocated for a BFR request and a resource allocated for another uplink communication. In some aspects, the UE may identify the collision of the resources and transmit the BFR request and/or the other uplink communication according to one or more criteria for collision resolution. In some aspects, the one or more criteria for collision resolution may relate to a type of the other uplink communication, a content of the other uplink communication, a size of the other uplink communication, whether the BFR request was triggered, whether the other uplink communication was triggered, and/or the like. In this way, the UE may be enabled to resolve the collision of the resources, thereby improving a performance of the BFR request and/or the other uplink communication.

Figure 5:
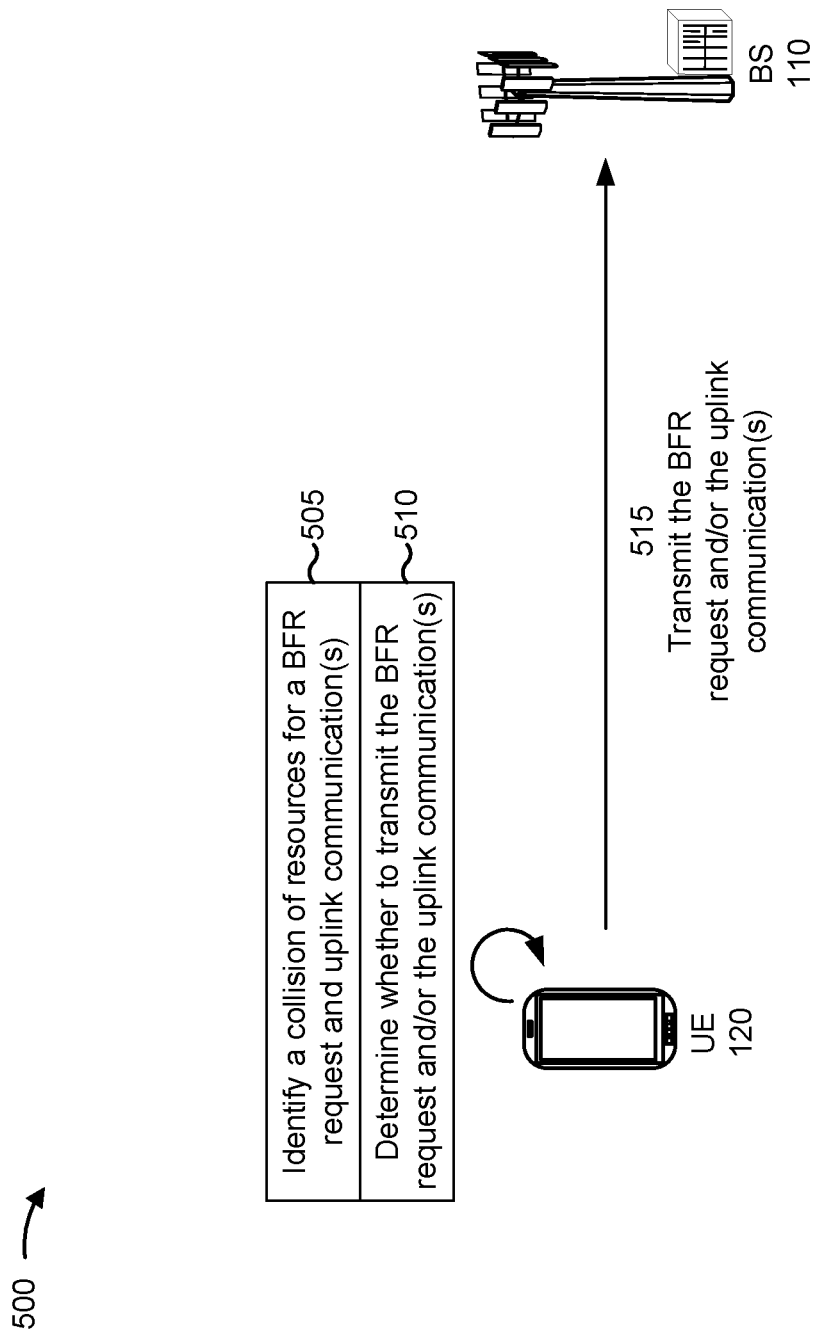
FIG. 5 is a diagram illustrating an example of resolution of collisions between beam failure recovery requests and uplink communications, in accordance with various aspects of the present disclosure.

FIG. 5 is a diagram illustrating an example 500 of resolution of collisions between BFR requests and uplink communications, in accordance with various aspects of the present disclosure. As shown in FIG. 5, a UE 120 may communicate with a base station 110 in connection with a BFR request (i.e., a scheduling request for BFR). In such a case, UE 120 may detect a beam failure associated with a secondary cell of BS 110 and thereby determine to transmit a BFR request (e.g., in a physical uplink control channel (PUCCH)) to a primary cell of BS 110. UE 120 may also determine to transmit the BFR request using a resource (e.g., a periodic resource) allocated to UE 120 for BFR requests.

As shown in FIG. 5, and by reference number 505, UE 120 may identify a collision of resources for the BFR request and one or more other uplink communications (e.g., one or more other uplink communications transmitted in a PUCCH). For example, UE 120 may determine the collision of the resources based at least in part on a determination that the resources overlap in at least one OFDM symbol. In some aspects, the one or more other uplink communications may include one or more scheduling requests, one or more ACK/NACK feedback communications (e.g., one or more hybrid automatic repeat request (HARQ)-ACKs), one or more CSI reports, one or more PUSCH communications, and/or the like.

As shown by reference number 510, UE 120 may determine whether to transmit the BFR request and/or the one or more other uplink communications. In some aspects, the BFR request may be associated with a higher priority group (e.g., a priority group associated with URLLC) and the one or more other uplink communications may be associated with a lower priority group (e.g., a priority group associated with eMBB). In this case, UE 120 may determine that the BFR request is to be transmitted and the one or more other uplink communications are to be dropped. Alternatively, the BFR request may be associated with a lower priority group and the one or more other uplink communications may be associated with a higher priority group. In this case, UE 120 may determine that the BFR request is to be dropped and the one or more other uplink communications are to be transmitted.

In some aspects, the BFR request and the one or more other uplink communications may be associated with a same priority group. In some aspects, UE 120 may determine that the collision is an error based at least in part on the BFR request and the one or more other uplink communications being configured on overlapping PUCCH resources in a PUCCH group. In such cases, UE 120 may resolve the collision according to one or more criteria for collision resolution.

In some aspects, the one or more other uplink communications may be one or more scheduling requests. In such cases, UE 120 may transmit the BFR request and may drop the one or more scheduling requests based at least in part on a determination that the BFR request is positive (e.g., a link recovery request (LRR) is positive, for example, beam failure was detected, and the BFR request was triggered for an occasion of the resource associated with the collision). Alternatively, UE 120 may drop the BFR request and may transmit one or more of the scheduling requests based at least in part on a determination that the BFR request is negative (e.g., the LRR is negative, for example, beam failure was not detected, and the BFR request was not triggered for the occasion of the resource associated with the collision) and the one or more of the scheduling requests are positive (e.g., LRR is positive, for example, the one or more of the scheduling requests were triggered for the occasion of the resource associated with the collision). Moreover, UE 120 may drop the BFR request and the one or more scheduling requests based at least in part on a determination that the BFR request and the one or more scheduling requests are negative.

In some aspects, the one or more other uplink communications may include one or more scheduling requests and other uplink control information (UCI). For example, the other UCI may include ACK/NACK feedback that includes one or two ACK/NACK (e.g., HARQ-ACK) information bits. In some aspects, the ACK/NACK feedback may be scheduled for transmission in PUCCH format 0 or PUCCH format 1. In such cases, UE 120 may drop the one or more scheduling requests, and UE 120 may selectively combine (e.g., multiplex, such as in a single payload) an indication of the BFR request with the other UCI before transmitting the other UCI. In some aspects, UE 120 may selectively combine the indication of the BFR request with the other UCI based at least in part on a format of the BFR request and a format of the other UCI.

For example, if the other UCI (e.g., ACK/NACK feedback) is in PUCCH format 0, and the BFR request is in PUCCH format 0 or 1, UE 120 may combine (e.g., multiplex) the indication of the BFR request and the other UCI on resources allocated for the other UCI. As another example, if the other UCI is in PUCCH format 1, and the BFR request is in PUCCH format 0, UE 120 may not combine the indication of the BFR request with the other UCI (e.g., UE 120 may drop the BFR request). As a further example, if the other UCI is in PUCCH format 1, and the BFR request is in PUCCH format 1 and is negative, UE 120 may transmit the other UCI (e.g., without the indication of the BFR request) in resources allocated for the other UCI. As an additional example, if the other UCI is in PUCCH format 1, and the BFR request is in PUCCH format 1 and is positive, UE 120 may combine (e.g., multiplex) the indication of the BFR request and the other UCI on resources allocated for the BFR request.

In some aspects, the other UCI may include ACK/NACK feedback and/or CSI that include more than two information bits. In such cases, UE 120 may combine (e.g., multiplex, such as in a single payload) an indication of at least one of the BFR request or the one or more scheduling requests with the other UCI before transmitting the other UCI. In some aspects, UE 120 may append the indication of the BFR request and/or the one more scheduling requests to the ACK/NACK feedback and/or prepend the indication of the BFR request and/or the one more scheduling requests to the CSI.

In some aspects, the indication may include a quantity of bits that are combined (e.g., concatenated) with the other UCI. The UE 120 may determine the quantity of bits based at least in part on a quantity of the one or more scheduling requests (K). For example, the quantity of bits may be $\lfloor \log_2 (K+2) \rfloor$. Stated another way, if the quantity of the one or more scheduling requests K includes the BFR request (i.e., the quantity of the one or more scheduling requests excluding the BFR request is K−1), then the quantity of bits may be $\lfloor \log_2 (K+1) \rfloor$. In such cases, UE 120 may set all of the bits to a value of zero to indicate that the BFR request and the one or more scheduling requests are negative. In some aspects, UE 120 may set a single bit (e.g., the first bit or the last bit) to a value of one, and the remaining bits to a value of zero, to indicate that the BFR request is positive, thereby dropping the one or more scheduling requests. In some aspects, UE 120 may use the remaining codepoints (i.e., codepoints other than the [0 . . . 0] codepoint and the [0 . . . 1] codepoint, for example) to indicate that a particular scheduling request is positive, thereby indicating that the BFR request is negative. In other words, the UE 120 may set the quantity of bits to a particular value to indicate the BFR request or a particular scheduling request.

In some aspects, the quantity of bits may be $1+\lfloor \log_2 (K+1) \rfloor$. In such a case, UE 120 may use a single bit (e.g., the first bit or the last bit) to provide an indication for the BFR request. For example, UE 120 may set the single bit to zero to indicate that the BFR request is negative or may set the single bit to one to indicate that the BFR request is positive. In addition, UE 120 may use the remaining bits (i.e., the remaining $\lfloor \log_2 (K+1) \rfloor$ bits other than the single bit) to provide an indication for the one or more scheduling requests. For example, UE 120 may set the remaining bits to a value of zero to indicate that the one or more scheduling requests are negative or set one or more of the remaining bits to a value of one to indicate a particular scheduling request that is positive. In some aspects, the single bit, used to indicate the BFR request, may be prepended or appended to the $\lfloor \log_2 (K+1) \rfloor$ bits that are used to indicate the one or more scheduling requests.

In some aspects, UE 120 may drop the one or more scheduling requests, and UE 120 may combine (e.g., multiplex, such as in a single payload) an indication of the BFR request with the other UCI before transmitting the other UCI. In such a case, the indication may be a single bit that indicates the BFR request. For example, UE 120 may set the single bit to zero to indicate that the BFR request is negative or may set the single bit to one to indicate that the BFR request is positive.

In some aspects, the one or more other uplink communications may include a PUSCH communication. In such cases, UE 120 may drop the BFR request and may transmit the PUSCH communication. In some aspects, UE 120 may drop the BFR request based at least in part on a determination that a BFR communication associated with the BFR request can be combined (e.g., multiplexed) with the PUSCH communication (e.g., resources allocated for the PUSCH communication are sufficient to transmit the PUSCH communication and the BFR communication). The BFR communication may be a medium access control (MAC) control element (CE) that indicates an identifier of the failed beam, one or more measurements (e.g., to identify a replacement beam), and/or the like.

In some aspects, UE 120 may transmit the BFR request over the PUSCH communication (e.g., piggyback the BFR request on the PUSCH communication). For example, UE 120 may transmit the BFR request over the PUSCH communication based at least in part on a determination that the BFR communication associated with the BFR request cannot be combined with the PUSCH communication (e.g., resources allocated for the PUSCH communication are insufficient to transmit the PUSCH communication and the BFR communication, the PUSCH communication is a retransmission, and/or the like).

In some aspects, UE 120 may drop the PUSCH communication and may transmit the BFR request based at least in part on a determination that the PUSCH communication does not include user data. For example, the PUSCH communication may include uplink control information, such as CSI. In some aspects, UE 120 may drop the PUSCH communication and may transmit the BFR request based at least in part on a determination that the PUSCH communication was to be transmitted to a secondary cell associated with a beam failure indicated by the BFR request (e.g., the beam failure that triggered the BFR request).

As shown by reference number 515, UE 120 may transmit, and BS 110 may receive, the BFR request and/or the one or more other uplink communications. That is, UE 120 may transmit the BFR request and/or the one or more other uplink communications based at least in part on a type or a content of the one or more other uplink communications and/or a content of the BFR request, as described above.

In some aspects, BS 110 may determine whether the transmission from the UE 120 includes the BFR request and/or the one or more other uplink communications based at least in part on the one or more criteria for collision resolution used by UE 120, as described above. For example, BS 110 also may identify the collision of the resources for the BFR request and the one or more other uplink communications and may determine whether the transmission includes the BFR request and/or the one or more other uplink communications based at least in part on the one or more criteria for collision resolution used by UE 120, as described above.

In this way, UE 120 may be enabled to resolve the collision of the resources for the BFR request and the one or more other uplink communication, thereby improving a performance of the BFR request and/or the one or more other uplink communications.

As indicated above, FIG. 5 is provided as an example. Other examples may differ from what is described with respect to FIG. 5.

FIG. 6 is a diagram illustrating an example process 600 performed, for example, by a UE, in accordance with various aspects of the present disclosure. Example process 600 is an example where a UE (e.g., UE 120 and/or the like) performs operations associated with resolution of collisions between BFR requests and uplink communications.

As shown in FIG. 6, in some aspects, process 600 may include identifying a collision of resources for a BFR request and one or more uplink communications (block 610). For example, the UE (e.g., using controller/processor 280 and/or the like) may identify a collision of resources for a BFR request and one or more uplink communications, as described above, for example, with reference to FIG. 5.

As further shown in FIG. 6, in some aspects, process 600 may include transmitting, based at least in part on identifying the collision, at least one of the BFR request or the one or more uplink communications based at least in part on a type or a content of the one or more uplink communications (block 620). For example, the UE (e.g., using controller/processor 280, transmit processor 264, TX MIMO processor 266, MOD 254, antenna 252, and/or the like) may transmit, based at least in part on identifying the collision, at least one of the BFR request or the one or more uplink communications based at least in part on a type or a content of the one or more uplink communications, as described above, for example, with reference to FIG. 5.

Process 600 may include additional aspects, such as any single aspect or any combination of aspects described below and/or in connection with one or more other processes described elsewhere herein.

In a first aspect, the BFR request is to be transmitted in a physical uplink control channel.

In a second aspect, alone or in combination with the first aspect, the one or more uplink communications are one or more scheduling requests, and the BFR request is transmitted, and the one or more scheduling requests are not transmitted, based at least in part on a determination that the BFR request is triggered. In a third aspect, alone or in combination with one or more of the first and second aspects, the one or more uplink communications are one or more scheduling requests, and the BFR request is not transmitted, and the one or more scheduling requests are transmitted, based at least in part on a determination that the BFR request is not triggered and the one or more scheduling requests are triggered.

In a fourth aspect, alone or in combination with one or more of the first through third aspects, the one or more uplink communications include one or more scheduling requests and uplink control information, and an indication of the BFR request is selectively combined with the uplink control information, and an indication of the one or more scheduling requests is not combined with the uplink control information, before the uplink control information is transmitted. In a fifth aspect, alone or in combination with one or more of the first through fourth aspects, the uplink control information is acknowledgment or negative acknowledgment feedback that is allocated one or two bits. In a sixth aspect, alone or in combination with one or more of the first through fifth aspects, the indication of the BFR request is selectively combined with the uplink control information based at least in part on a format of the uplink control information and a format of the BFR request.

In a seventh aspect, alone or in combination with one or more of the first through sixth aspects, the one or more uplink communications include one or more scheduling requests and uplink control information, and an indication of at least one of the BFR request or the one or more scheduling requests is combined with the uplink control information before the uplink control information is transmitted. In an eighth aspect, alone or in combination with one or more of the first through seventh aspects, the uplink control information includes at least one of channel state information or acknowledgment or negative acknowledgment feedback that is allocated greater than two bits.

In a ninth aspect, alone or in combination with one or more of the first through eighth aspects, the indication indicates the BFR request based at least in part on a determination that the BFR request is triggered. In a tenth aspect, alone or in combination with one or more of the first through ninth aspects, the indication indicates the one or more scheduling requests based at least in part on a determination that the BFR request is not triggered and the one or more scheduling requests are triggered. In an eleventh aspect, alone or in combination with one or more of the first through tenth aspects, the indication includes a quantity of bits, and a first value of the quantity of bits indicates that the BFR request and the one or more scheduling requests are not triggered, a second value of the quantity of bits indicates that the BFR request is triggered and the one or more scheduling requests are not triggered, and a third value of the quantity of bits indicates that the BFR request is not triggered and a particular scheduling request of the one or more scheduling requests is triggered.

In a twelfth aspect, alone or in combination with one or more of the first through eleventh aspects, the indication indicates the BFR request and the one or more scheduling requests. In a thirteenth aspect, alone or in combination with one or more of the first through twelfth aspects, the indication includes a quantity of bits combined with an additional bit, and the quantity of bits indicate whether a particular scheduling request of the one or more scheduling requests is triggered, and the additional bit indicates whether the BFR request is triggered.

In a fourteenth aspect, alone or in combination with one or more of the first through thirteenth aspects, the one or more uplink communications include one or more scheduling requests and uplink control information, and an indication of the BFR request is combined with the uplink control information, and an indication of the one or more scheduling requests is not combined with the uplink control information, before the uplink control information is transmitted. In a fifteenth aspect, alone or in combination with one or more of the first through fourteenth aspects, the uplink control information includes at least one of channel state information or acknowledgment or negative acknowledgment feedback that is allocated greater than two bits.

In a sixteenth aspect, alone or in combination with one or more of the first through fifteenth aspects, the one or more uplink communications include a PUSCH communication, and the PUSCH communication is transmitted and the BFR request is not transmitted. In a seventeenth aspect, alone or in combination with one or more of the first through sixteenth aspects, the BFR request is not transmitted based at least in part on a determination that a BFR communication associated with the BFR request is to be combined with the PUSCH communication. In an eighteenth aspect, alone or in combination with one or more of the first through seventeenth aspects, the one or more uplink communications include a PUSCH communication, and the BFR request is transmitted over the PUSCH communication based at least in part on a determination that a BFR communication associated with the BFR request is not to be combined with the PUSCH communication.

In a nineteenth aspect, alone or in combination with one or more of the first through eighteenth aspects, the one or more uplink communications include a PUSCH communication, and the BFR request is transmitted, and the PUSCH communication is not transmitted, based at least in part on a determination that the PUSCH communication does not include user data. In a twentieth aspect, alone or in combination with one or more of the first through nineteenth aspects, the one or more uplink communications include a PUSCH communication, and the BFR request is transmitted, and the PUSCH communication is not transmitted, based at least in part on a determination that the PUSCH communication is to be transmitted to a cell associated with a beam failure indicated by the BFR request.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a UE, in accordance with various aspects of the present disclosure. Example process 700 is an example where the UE (e.g., UE 120, and/or the like) performs operations associated with resolution of collisions between beam failure recovery requests and uplink communications.

As shown in FIG. 7, in some aspects, process 700 may include combining an indication of a BFR request or one or more scheduling requests with uplink control information that is to be transmitted in a resource (block 710). For example, the UE (e.g., using controller/processor 280, and/or the like) may combine an indication of a BFR request or one or more scheduling requests with uplink control information that is to be transmitted in a resource, as described above, for example, with reference to FIG. 5.

As further shown in FIG. 7, in some aspects, process 700 may include transmitting the uplink control information combined with the indication in the resource (block 720). For example, the UE (e.g., using controller/processor 280, transmit processor 264, TX MIMO processor 266, MOD 254, antenna 252, and/or the like) may transmit the uplink control information combined with the indication in the resource, as described above, for example, with reference to FIG. 5.

Process 700 may include additional aspects, such as any single aspect or any combination of aspects described below and/or in connection with one or more other processes described elsewhere herein.

In a first aspect, process 700 includes identifying a collision of resources for the uplink control information and at least one of the BFR request or the one or more scheduling requests.

In a second aspect, alone or in combination with the first aspect, the BFR request is to be transmitted in a physical uplink control channel. In a third aspect, alone or in combination with one or more of the first and second aspects, the uplink control information includes at least one of channel state information or acknowledgment or negative acknowledgment feedback that is allocated greater than two bits.

In a fourth aspect, alone or in combination with one or more of the first through third aspects, the indication indicates the BFR request based at least in part on a determination that the BFR request is triggered. In a fifth aspect, alone or in combination with one or more of the first through fourth aspects, the indication indicates the one or more scheduling requests based at least in part on a determination that the BFR request is not triggered and the one or more scheduling requests are triggered.

In a sixth aspect, alone or in combination with one or more of the first through fifth aspects, the indication includes a quantity of bits, and a first value of the quantity of bits indicates that the BFR request and the one or more scheduling requests are not triggered, a second value of the quantity of bits indicates that the BFR request is triggered, and a third value of the quantity of bits indicates that the BFR request is not triggered and a particular scheduling request of the one or more scheduling requests is triggered.

In a seventh aspect, alone or in combination with one or more of the first through sixth aspects, the indication includes a quantity of bits that is determined based at least in part on the BFR request and a quantity of the one or more scheduling requests, and the quantity of bits is combined with the uplink control information by concatenation.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    combining an indication of a beam failure recovery (BFR) request or one or more scheduling requests with at least one of channel state information or acknowledgment or negative acknowledgment (ACK/NACK) feedback that is to be transmitted in a resource, such that the BFR request is combined with the at least one of channel state information or ACK/NACK feedback when the BFR request is triggered regardless of whether the one or more scheduling requests are triggered,
    wherein combining the indication with the at least one of channel state information or ACK/NACK feedback includes at least one of:
        appending the indication to the ACK/NACK feedback; or
        prepending the indication to the channel state information; and
    transmitting the at least one of channel state information or ACK/NACK feedback combined with the indication in the resource.

2. The method of claim 1, further comprising:
    identifying a collision of resources for uplink control information and at least one of the BFR request or the one or more scheduling requests.

3. The method of claim 1, wherein the BFR request is to be transmitted in a physical uplink control channel.

4. The method of claim 1, wherein the at least one of channel state information or ACK/NACK feedback is allocated greater than two bits.

5. The method of claim 1, wherein the indication indicates the BFR request based at least in part on a determination that the BFR request is triggered.

6. The method of claim 1, wherein the indication indicates the one or more scheduling requests based at least in part on a determination that the BFR request is not triggered and the one or more scheduling requests are triggered.

7. The method of claim 1, wherein the indication includes a quantity of bits, and
    wherein a first value of the quantity of bits indicates that the BFR request and the one or more scheduling requests are not triggered, a second value of the quantity of bits indicates that the BFR request is triggered, and a third value of the quantity of bits indicates that the BFR request is not triggered and a particular scheduling request of the one or more scheduling requests is triggered.

8. The method of claim 1, wherein the indication includes a quantity of bits that is determined based at least in part on the BFR request and a quantity of the one or more scheduling requests, and
    wherein the quantity of bits is combined with the at least one of channel state information or ACK/NACK feedback by concatenation.

9. The method of claim 1, wherein combining the indication with the at least one of channel state information or ACK/NACK feedback includes:
    appending the indication to the ACK/NACK feedback.

10. The method of claim 1, wherein combining the indication with the at least one of channel state information or ACK/NACK feedback includes:
    prepending the indication to the channel state information.

11. A method of wireless communication performed by a user equipment (UE), comprising:
    identifying a collision of resources for a beam failure recovery (BFR) request and one or more uplink communications; and
    transmitting, based at least in part on identifying the collision, at least one of the BFR request or the one or more uplink communications based at least in part on a type or a content of the one or more uplink communications, wherein the one or more uplink communications include one or more scheduling requests and uplink control information, and wherein an indication of the BFR request is selectively combined with the uplink control information, and an indication of the one or more scheduling requests is not combined with the uplink control information, before the uplink control information is transmitted.

12. The method of claim 11, wherein the BFR request is to be transmitted in a physical uplink control channel.

13. The method of claim 11, wherein the one or more uplink communications are one or more scheduling requests, and wherein the BFR request is transmitted, and the one or more scheduling requests are not transmitted, based at least in part on a determination that the BFR request is triggered.

14. The method of claim 11, wherein the uplink control information is acknowledgment or negative acknowledgment feedback that is allocated one or two bits.

15. The method of claim 11, wherein the indication of the BFR request is selectively combined with the uplink control information based at least in part on a format of the uplink control information and a format of the BFR request.

16. The method of claim 11, wherein the one or more uplink communications include a physical uplink shared channel (PUSCH) communication, and wherein the PUSCH communication is transmitted and the BFR request is not transmitted.

17. The method of claim 16, wherein the BFR request is not transmitted based at least in part on a determination that a BFR communication associated with the BFR request is to be combined with the PUSCH communication.

18. The method of claim 11, wherein the one or more uplink communications include a physical uplink shared channel (PUSCH) communication, and wherein the BFR request is transmitted over the PUSCH communication based at least in part on a determination that a BFR communication associated with the BFR request is not to be combined with the PUSCH communication.

19. The method of claim 11, wherein the one or more uplink communications include a physical uplink shared channel (PUSCH) communication, and wherein the BFR request is transmitted, and the PUSCH communication is not transmitted, based at least in part on a determination that the PUSCH communication does not include user data.

20. The method of claim 11, wherein the one or more uplink communications include a physical uplink shared channel (PUSCH) communication, and wherein the BFR request is transmitted, and the PUSCH communication is not transmitted, based at least in part on a determination that the PUSCH communication is to be transmitted to a cell associated with a beam failure indicated by the BFR request.

21. A user equipment (UE) for wireless communication, comprising:

a memory; and one or more processors coupled to the memory, the memory and the one or more processors configured to:
combine an indication of a beam failure recovery (BFR) request or one or more scheduling requests with at least one of channel state information or acknowledgment or negative acknowledgment (ACK/NACK) feedback that is to be transmitted in a resource, such that the BFR request is combined with the at least one of channel state information or ACK/NACK feedback when the BFR request is triggered regardless of whether the one or more scheduling requests are triggered, wherein combining the indication with the at least one of channel state information or ACK/NACK feedback includes at least one of:
appending the indication to the ACK/NACK feedback; or
prepending the indication to the channel state information; and
transmit the at least one of channel state information or ACK/NACK feedback combined with the indication in the resource.

22. The UE of claim 21, wherein the at least one of channel state information or ACK/NACK feedback is allocated greater than two bits.

23. The UE of claim 21, wherein the indication indicates the BFR request based at least in part on a determination that the BFR request is triggered.

24. The UE of claim 21, wherein the indication indicates the one or more scheduling requests based at least in part on a determination that the BFR request is not triggered and the one or more scheduling requests are triggered.

25. The UE of claim 21, wherein the indication includes a quantity of bits, and wherein a first value of the quantity of bits indicates that the BFR request and the one or more scheduling requests are not triggered, a second value of the quantity of bits indicates that the BFR request is triggered, and a third value of the quantity of bits indicates that the BFR request is not triggered and a particular scheduling request of the one or more scheduling requests is triggered.

26. A user equipment (UE) for wireless communication, comprising:

a memory; and one or more processors coupled to the memory, the memory and the one or more processors configured to:
identify a collision of resources for a beam failure recovery (BFR) request and one or more uplink communications; and
transmit, based at least in part on identifying the collision, at least one of the BFR request or the one or more uplink communications based at least in part on a type or a content of the one or more uplink communications, wherein the one or more uplink communications include one or more scheduling requests and uplink control information, and wherein an indication of the BFR request is selectively combined with the uplink control information, and an indication of the one or more scheduling requests is not combined with the uplink control information, before the uplink control information is transmitted.

27. The UE of claim 26, wherein the one or more uplink communications are one or more scheduling requests, and wherein the BFR request is to be transmitted, and the one or more scheduling requests are not to be transmitted, based at least in part on a determination that the BFR request is triggered.

28. The UE of claim 26, wherein the one or more uplink communications include a physical uplink shared channel (PUSCH) communication, and wherein the PUSCH communication is to be transmitted and the BFR request is not to be transmitted.

29. The UE of claim 26, wherein the one or more uplink communications include a physical uplink shared channel (PUSCH) communication, and
  wherein the BFR request is to be transmitted over the PUSCH communication based at least in part on a determination that a BFR communication associated with the BFR request is not to be combined with the PUSCH communication.

30. The UE of claim 21, wherein combining the indication with the at least one of channel state information or ACK/NACK feedback includes:
  appending the indication to the ACK/NACK feedback.

\* \* \* \* \*